Sept. 4, 1951 W. J. HUNT 2,566,767
SELECTING DEVICE
Filed May 1, 1946 6 Sheets-Sheet 1

INVENTOR.
William J. Hunt
BY Mueller and Mason
Attorneys

Sept. 4, 1951 W. J. HUNT 2,566,767
SELECTING DEVICE
Filed May 1, 1946 6 Sheets-Sheet 2

INVENTOR.
William J. Hunt
BY Mueller and Mason
Attorneys

Sept. 4, 1951 W. J. HUNT 2,566,767
SELECTING DEVICE
Filed May 1, 1946 6 Sheets-Sheet 3
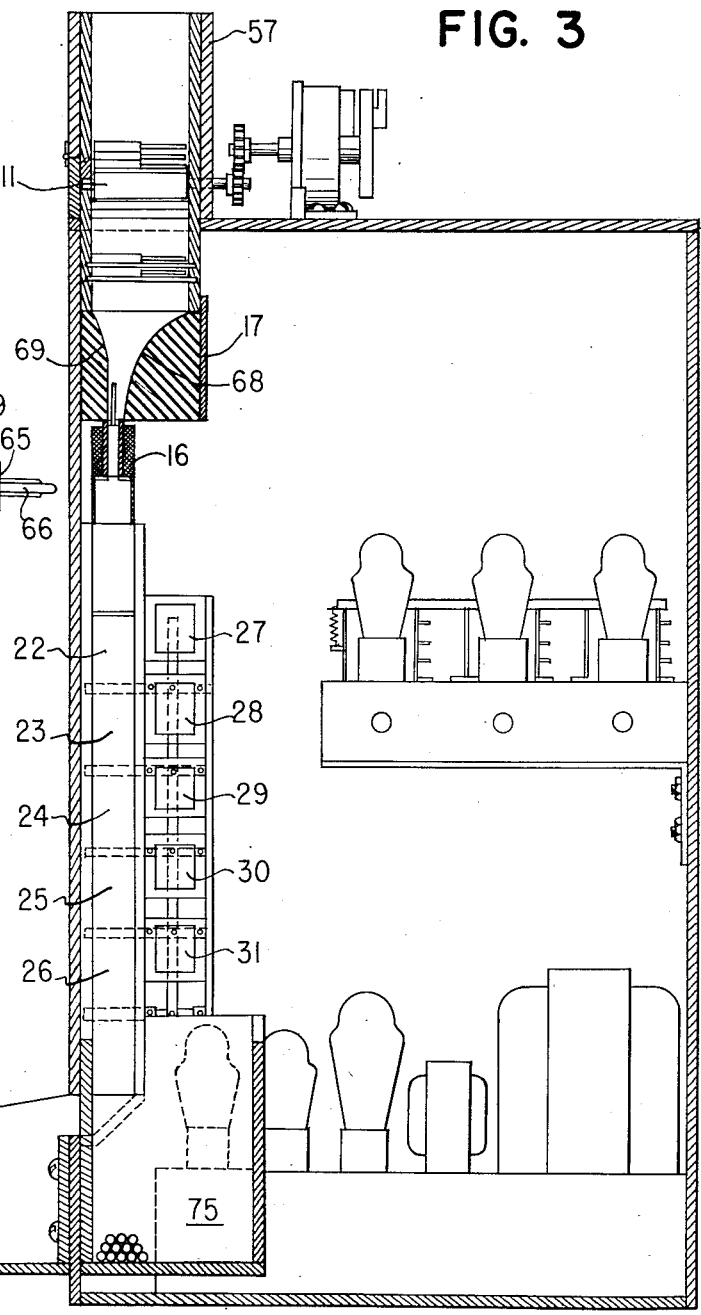
INVENTOR.
William J. Hunt
BY Mueller and Mason
Attorneys Sept. 4, 1951 W. J. HUNT 2,566,767
SELECTING DEVICE
Filed May 1, 1946 6 Sheets-Sheet 4

INVENTOR.
William J. Hunt
BY Mueller and Mason
Attorneys

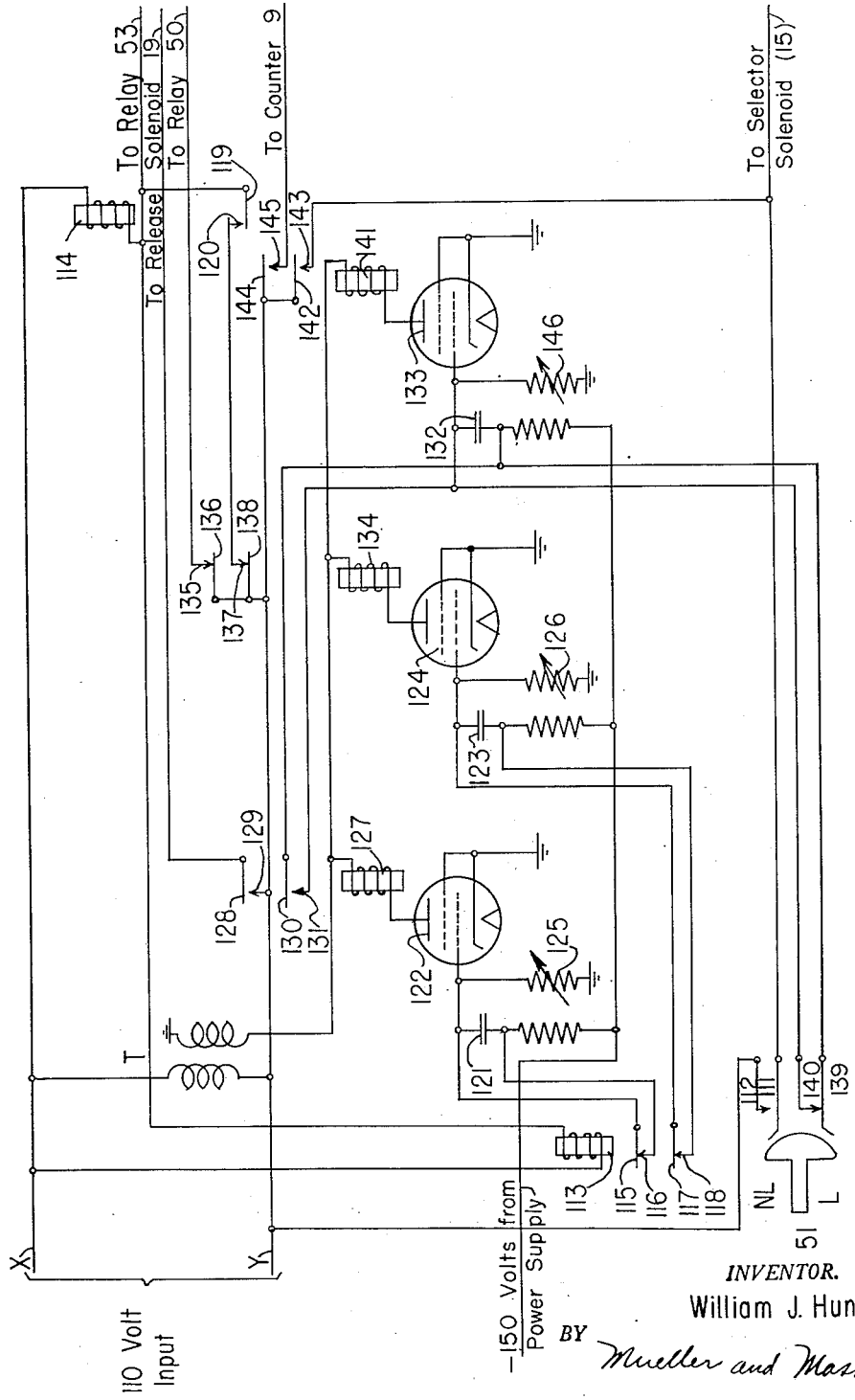

Patented Sept. 4, 1951

2,566,767

UNITED STATES PATENT OFFICE 2,566,767

SELECTING DEVICE

William J. Hunt, Chicago, Ill., assignor to Motorola, Inc., Chicago, Ill., a corporation of Illinois Application May 1, 1946, Serial No. 666,469

1 Claim. (Cl. 209—81)

This invention relates to automatic sorting devices and in particular to an automatic device for production checking and sorting of electrical components in accordance with the variation of the electrical characteristics of the components as compared to a standard component.

In the design of radio apparatus or other electronic equipment, it is necessary that components such as resistors, condensers, cores, etc., which are manufactured in large quantities by production methods be of a given degree of accuracy. In some cases a fairly wide tolerance is permitted, but in other instances the various units such as coils and the iron slugs used as cores therefor must be matched very carefully to provide satisfactory operation.

In the prior art it has been customary to check these components manually using standard meters which are available but this method has a number of disadvantages. The method of manually checking electrical components is objectionable first because of the large amount of time required for the checking operation. In many cases the components are of very simple and inexpensive construction and the cost of checking or calibrating the components is the greatest portion of the total cost. Another disadvantage is that standard meters which are suitable for checking such components are, in general, quite expensive and delicate pieces of apparatus requiring extreme care in the use thereof and also a great amount of servicing to keep the instruments in condition for proper and accurate use. The third disadanvtage of manually checking components is that a certain number of errors will be made by the person making the tests. This human element can be eliminated by use of a completely automatic machine. An additional disadvantage of manually testing electrical components is that in many instances the use of a component in a particular circuit is very critical and the test of the component independent of this circuit is of little value. For this reason it is desirable that a checking device be provided which is capable of comparing the characteristics of a particular component in a circuit simulating the actual circuit in which the component will be used rather than merely measuring the individual characteristics of the component.

It is, therefore, an object of the present invention to provide an automatic device for checking and sorting electrical components in accordance with the electrical characteristics thereof.

It is a further object of this invention to provide an automatic device which is adapted to compare the electrical characteristics of components with a standard component and to automatically sort the components in accordance with the amount of deviation from said standard component.

It is a still further object of this invention to provide an automatic device which is adapted to compare the electrical characteristics of components with those of a standard component, in a circuit simulating the circuits in which the components will actually be used.

It is an additional object of this invention to provide an automatic sorting mechanism for comparing the permeability of iron cores with a standard core and to automatically sort the cores into groups depending upon the amount of deviation thereof from said standard core.

A feature of this invention is the provision of a device for automatically placing electrical components in a condition simulating the condition in which the components are intended to be used and for automatically comparing the electrical characteristics thereof with those of a standard component under the same conditions.

A further feature of this invention is the provision of a circuit for producing testing of components, which is similar to circuits in which the components will be used, and which is adapted to produce varying voltages depending upon the operation of the component being tested in the circuit as compared with the operation of a standard component in the same circuit.

An additional feature of this invention is the provision of a distributing mechanism for a checking device including a plurality of bins having closures therefor actuated by relays which are controlled by said checking device which is adapted to receive the components as soon as they have been checked and automatically place each component in the bin which is opened by the checking device when that particular component was checked.

Another feature of this invention is the provision of timing means for the checking and sorting device for controlling the sequence of operation of the mechanism for feeding components into said device, the checking unit itself, and the mechanism for distributing the components in accordance with the test.

An additional feature of this invention is the provision of a checking and sorting device adapted to receive iron slug cores for use in permeability tuned circuits and to compare the permeability of said slugs with a standard slug under conditions simulating actual operating conditions, and for sorting said slugs into groups depending upon the deviation of said slugs from said standard slug.

Other objects, features and advantages of the invention will be apparent from a consideration of the following description taken in connection with the accompanying drawings in which:

Fig. 3 is a front view partly in section of the feeding and distributing mechanism of Fig. 2;

Fig. 4 is a cross-sectional detailed view of the unit for individually feeding the slugs into the checking mechanism;

Fig. 8 is a detailed wiring diagram of the starting and timing circuits; and

In practicing my invention I provide a device for checking and sorting iron core slugs according to their permeability. The device includes a mechanical section, an electrical section, and a timing section which are of general application and can easily be modified for use in checking other electrical components. The mechanical section includes means for feeding the slugs one by one into a coil and after operation of the electrical section, for distributing the slugs into various bins in accordance with the reaction produced in the electrical circuit by each individual slug. The electrical section or the checking unit includes the coil in which the slugs are inserted and circuits connected thereto which are adapted to produce a varying voltage depending on the permeability of the slug being tested. This voltage is utilized to selectively actuate relays controlling the distribution of the components to the various bins in the mechanical section. The timing section controls the means for feeding the slugs into the coil, the relays of the electrical section, and the distributing mechanism and causes operation in the proper sequence. The timing section can be set to provide a continuous repetition of the sequence for automatic operation of the checking and sorting device.

Figure 1:
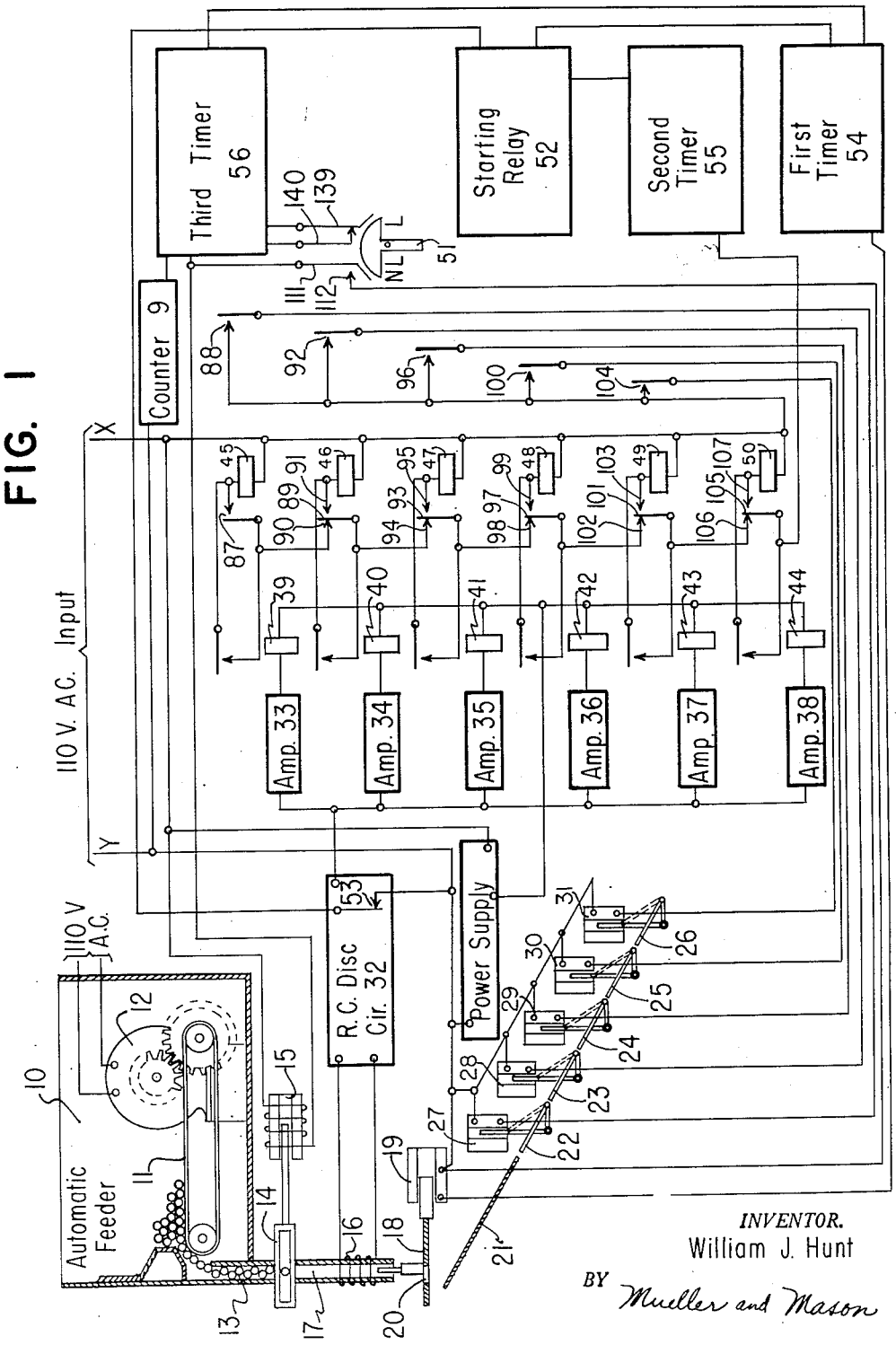
Fig. 1 is a schematic diagram of the checking and sorting device of this invention.

Referring now to the drawings, in Fig. 1 is shown an automatic feeding mechanism 10 including a conveyer belt 11 driven by a motor 12 arranged to feed the slugs into a channel 13. A dropping unit 14 is provided in the channel 13 and is actuated by solenoid 15 for feeding the slugs one by one into a coil 16. For the purpose of positioning the slugs properly in the coil, a righter box 17 is positioned between the dropping unit 14 and the coil 16. This righter box must be made of non-magnetic material so that the magnetic flux in the slug when it is being checked will not be affected thereby. Preferably the righter box should be constructed of wood or plastic material. A movable insulating bar 18 is positioned below the coil for retaining the slug in the coil while it is being checked, and is connected to a solenoid 19 which when actuated cause the bar to move in such a manner that the slug drops through an opening 20 in the bar onto chute 21. The chute includes a plurality of hinged closures 22, 23, 24, 25 and 26 which are operated by solenoids 27, 28, 29, 30 and 31. These closures are arranged in such a manner that a slug falling down the chute 21 will be dropped into a particular bin depending upon which of the closures is opened. The structure of the bins and closures will be described more in detail later.

The coil unit 16 is electrically connected to a radio frequency and discriminator circuit 32 which is arranged to provide varying voltages in the output circuit thereof depending upon the permeability of the core positioned in the coil 16. The details of the operation of the radio frequency and discriminator circuit will be fully described in connection with Figs. 5 and 6. The output of the discriminator circuit is connected to a plurality of direct current amplifiers 33, 34, 35, 36, 37 and 38 which operate direct current relays 39, 40, 41, 42, 43 and 44 respectively and are arranged to selectively actuate the relays in accordance with the voltage supplied to the amplifiers by the discriminator circuit. The direct current relays are connected to alternating current relays 45, 46, 47, 48, 49 and 50 which are adapted to selectively actuate the solenoids 27 through 31 for operating the closures to the bins.

A starting and timing section is provided including a switch 51 for initiating operation of the device. The switch 51 has a non-locking position to the left for manual operation of the device and a locking position to the right for automatic operation. For manual operation, the contacts 111 and 112 are closed energizing solenoid 15 causing the feeding mechanism to drop a slug in the coil unit 16. A starting relay 52 in the timing section is actuated by relay 53 in the radio frequency and discriminator circuit when the presence of a slug in the coil 16 is detected by this circuit. The starting relay 52 initiates operation of a first timer 54 which operates the solenoid 19 releasing the slug from the coil and a second timer 55 which disconnects the A. C. relays causing the closure which was opened by the checking unit to be returned to its normal closed position. For automatic operation of the device, the contacts 139 and 140 are disengaged switching the third timer 56 into the circuit. This timer is arranged to energize solenoid 15 starting operation of the device and cooperates with the first and second timers to cause continuous operation of the device. The third timer may also be connected to a counter 9 to indicate the number of components checked during automatic operation of the device. The details of the timing circuit are shown in Fig. 8.

Figure 2:
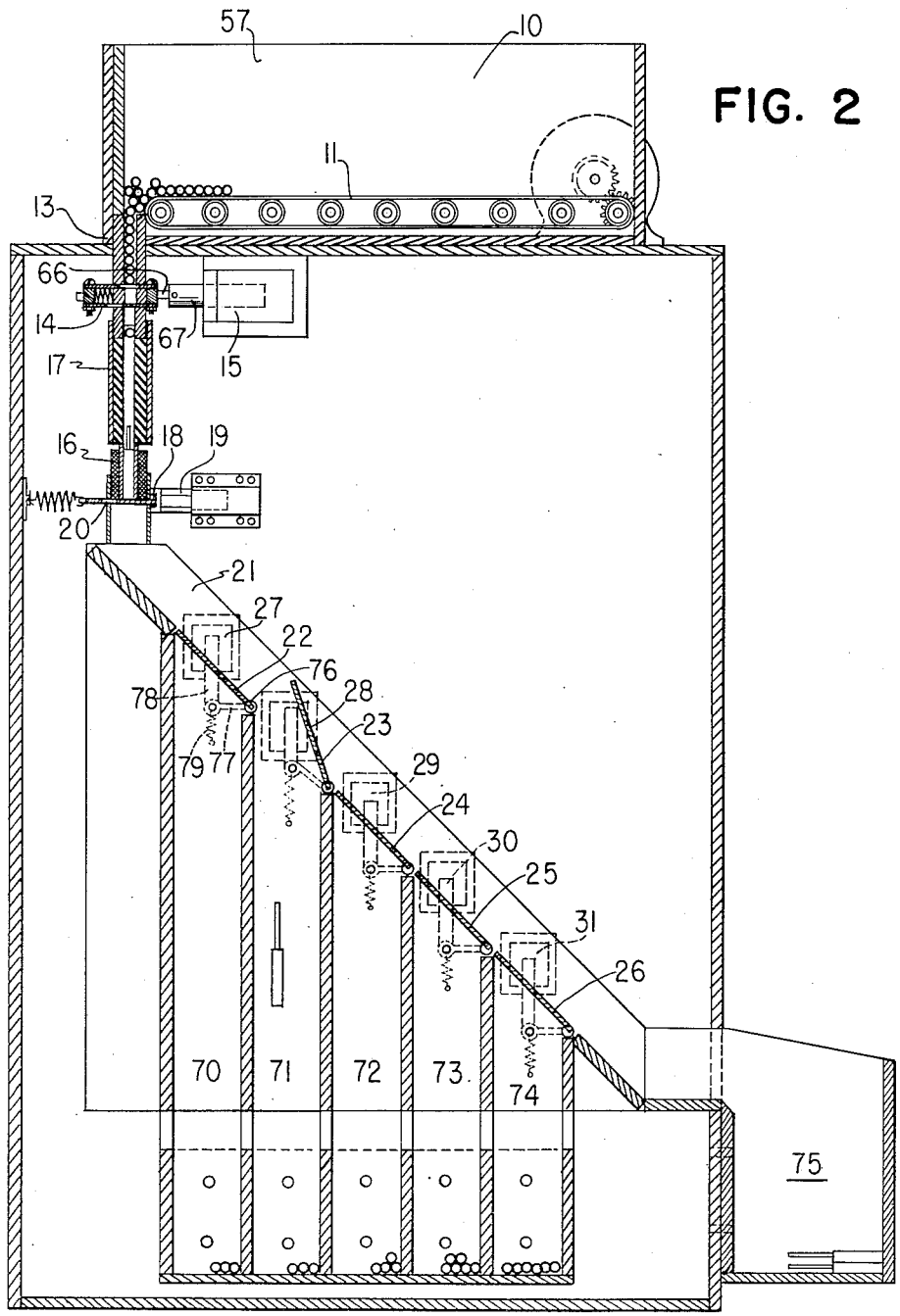
Fig. 2 is a cross-sectional view illustrating the mechanical mechanism for feeding and distributing slugs.

Referring now to Figs. 2, 3 and 4, the feeding mechanism 10 is shown including hopper 57 in which the slugs are placed to be carried by the conveyer 11 to the channel 13 as previously described. The mechanism for dropping the slugs one by one into the coil is shown in detail in Fig. 4 and includes a first slide 58 having an opening 59 therein with a tapering edge 60 which is adapted to slide between adjacent slugs, and a second slide 61 having an opening 62 therein for dropping a slug. For the purpose of holding the assembly in a normal position, a spring 63 is provided between the channel 13 and the bridging member 64 which connects the two slides at one end. A bridging member 65 connects the two slides on the other side of the channel and has an actuating member 66 secured thereto. The actuating member 66 is connected to a core 67 which is positioned in the solenoid 15 to provide movement of the slides by the solenoid. As is apparent from Fig. 4, as the slides are moved to the right by the solenoid, the sharp edge 60 will separate the slugs allowing only one slug to drop through the opening 62 in the lower slide. As the slide returns to the left by the action of spring 63 another slug will drop through the opening 59 in the slide 58 and will rest on slide 61 as shown. With particular reference to Fig. 3, it is seen that the slugs are positioned in the hopper with the extensions thereof all in the same direction so that as the slugs are fed through the dropping mechanism they will be dropped in the righter box 17 so that the large part of the slug will be positioned in the coil unit 16 as shown. The righter box includes opposed curved surfaces 68 and 69 which are shaped so that the slug will be automatically turned to the desired position. As previously stated, the righter box must be made of non-magnetic material. After the slug has been checked by the electrical section of the device the timing mechanism will cause the insulating bar 18 to be moved by the solenoid 19 causing the slug to be dropped through the opening 20 therein into the chute 21.

As is shown in Fig. 2, the distributing mechanism includes a plurality of bins 70, 71, 72, 73 and 74 into which the slugs are sorted and a bin 75 for slugs which are rejected. The bins 70 through 74 include closure members 22 through 26 previously described which are actuated by solenoids 27 through 31. Each closure includes a pivot 76 and an actuating arm 77 which is coupled to a core 78 positioned within one of the solenoids so that as the solenoid is energized the core will be drawn therein and the closure will swing around the pivot to an open position. In Fig. 2 solenoid 28 is shown actuated with the closure 23 in open position. Springs 79 are provided to return the closures to closed position when the solenoids are no longer energized.

The electrical circuits utilized in the checking means may be provided in the cabinet housing the feeding and distributing means as shown in Fig. 3. However, positioning of the electrical circuits adjacent the mechanical feeding and distributing means is not essential to proper operation of the device.

For satisfactory operation of the slug cores in permeability tuned circuits, it is necessary that the slugs be quite accurately matched with the coils in which they are used. Slugs having a permeability differing from that of a standard by more than 2% are entirely unsatisfactory for operation and the slugs which are within the plus or minus 2% limits must be sorted in groups having similar tolerance and matched with particular coils. It has been found satisfactory to sort the slugs in five groups in which the deviation of the slugs in each group from a standard slug are as follows:

(a) —2% to —1.2%  (d) +.4% to +1.2%
(b) —1.2% to —.4%  (e) +1.2% to +2.0%
(c) —.4% to +.4%

Figure 5:
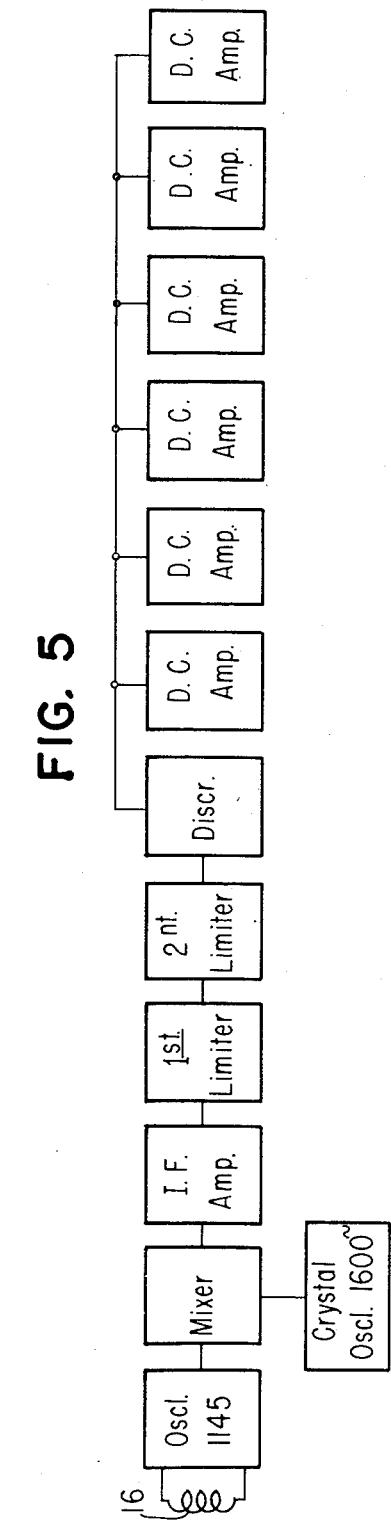
Fig. 5 is a schematic diagram showing the various units in the radio frequency and discriminator circuit.
Figure 7:
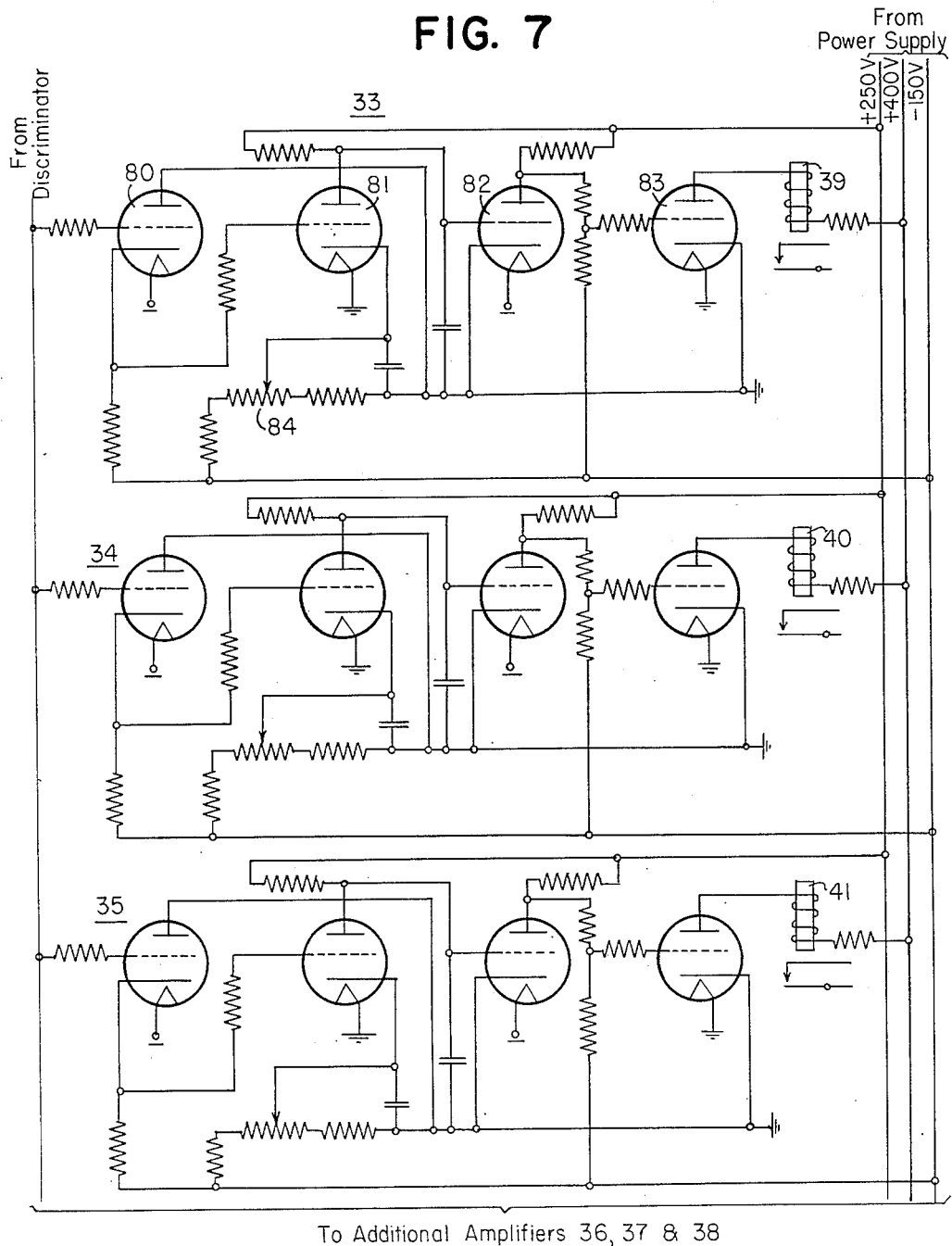
Fig. 7 is a detailed wiring diagram of the direct current amplifier circuits.

The circuits of the electrical checking system are shown more in detail in Figs. 5 and 7. In Fig. 5 the coil 16 is shown connected to an oscillator the frequency of which depends upon the permeability of the slug in the coil 16. The output of oscillator is combined with the output of a crystal oscillator in the mixer as shown. As it is desirable to check the slugs under conditions simulating actual operating conditions the coil 16 and oscillators are so designed that when a standard slug is used frequencies within the standard broadcast band are produced. In a specific embodiment an oscillator providing an output frequency of 1145 is mixed with a crystal oscillator having an output frequency of 1600 kilocycles resulting in an intermediate frequency of 455 kilocycles from the mixer. This frequency is amplified by the intermediate frequency amplifier and is fed through first and second limiters and to the discriminator. The discriminator converts the variable frequency fed thereto into variable direct current voltages in a well known manner. The discriminator is adjusted so that a zero voltage is provided when a standard slug is positioned in the core 16 and that negative and positive voltages will be provided when slugs having less and greater permeability are positioned in the coil 16.

Figure 6:
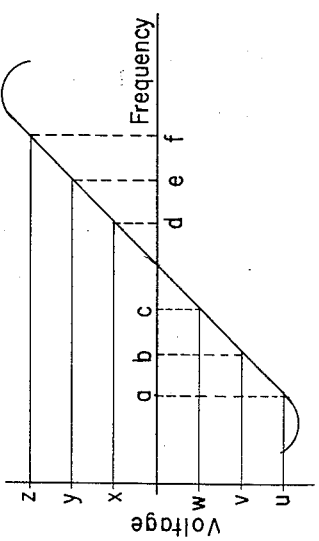
Fig. 6 is a curve showing the output of the discriminator circuit.

Fig. 6 shows the output response curve of a discriminator with output voltage plotted against input frequency. Various input frequencies are caused by variation in the frequency of oscillator due to use of slugs having varying permeability. Points on the horizontal axis represent frequencies produced by slugs having varying degrees of permeability and points on the vertical axis represent output voltages corresponding to these frequencies. The direct current amplifiers operate on the straight line part of the response curve. The percent deviation, frequency and voltage are related as follows:

| Per Cent Deviation | Frequency | Voltage |
| --- | --- | --- |
| +2.0 | a | u |
| +1.2 | b | v |
| +.4 | c | w |
| —.4 | d | x |
| —1.2 | e | y |
| —2.0 | f | z |

It is, therefore, seen that the desired grouping of slugs can be obtained by sorting the slugs in accordance with the voltage produced by the discriminator when the slugs are inserted in the coil. It is apparent that various tolerances and grouping could be made other than those specified above.

For the purpose of describing the utilization made of the varying voltage output of the discriminator, reference is made to Fig. 7 which shows the detailed circuit of three of the amplifiers which are connected to the discriminator, together with the direct current relays connected to the outputs thereof. These amplifiers are the amplifiers 33, 34 and 35 of Fig. 1, the amplifiers 36, 37 and 38 not being shown in Fig. 7 as they are not necessary for an understanding of the operation of the circuit. The amplifiers are of standard construction and will not be described in detail. The amplifiers are each composed of four stages comprising triodes 80, 81, 82 and 83 together with the necessary coupling components. The tubes 80 and 81 and the tubes 82 and 83 may be combined in a single envelope if desired to reduce the number of tubes in the amplifiers. A variable resistor 84 is provided in the cathode circuit of the second tube to permit the amplifiers to be adjusted to operate the relays in the output circuits thereof depending upon the voltage furnished by the discriminator.

The resistor 84 of the amplifier 33 will be adjusted so that the relay 39 will be actuated when a voltage more positive than a predetermined negative voltage is received from the discriminator, and the amplifier 34 will be adjusted so that relay 40 will not be actuated until a still more positive voltage is received and so on. Referring to the chart of Fig. 6, a voltage more negative than $u$ will not trigger any of the relays and a voltage more positive than $u$ will trigger relay 39. A voltage more positive than $v$ will trigger relay 40 as well as relay 39 and so on. It can, therefore, be seen that in many instances more than one relay will be actuated and if a voltage more positive than $z$ is produced, all the relays 39 to 44 will be actuated. The entire bank of amplifiers are adjusted to correspond to the deviation groups previously specified. Accordingly, it is apparent that various relays will be operated depending upon which deviation group the slug being tested falls into.

Referring now to Fig. 1, it is seen that the direct current relays are arranged to operate the alternating current relays 45 to 50 inclusive. The alternating current relays are provided with holding contacts which are arranged in cascade manner so that when any one relay is actuated all of the previous relays are released. That is, relay 45 includes contacts 87 for holding the relay closed and contacts 88 for operating the solenoid 27. The relay 46 includes a movable member 89 adapted to cooperate with fixed contacts 90 and 91 for establishing the holding circuits and contacts 92 for operating the solenoid 28 and opening closure 22. It can be seen that the holding circuit for relay 45 through contacts 87 is completed through contacts 89 and 90 of relay 46, which contacts are opened when relay 46 is actuated. Accordingly, when relay 46 is actuated by amplifier 34 and direct current relay 40, the movable contact 89 will move away from contact 90 releasing relay 45, and into contact with contact 91 holding the relay 46 in closed position. Also the contacts 92 will be closed causing the solenoid 28 to be energized and the closure 23 to be opened. The breaking of contacts 89 and 90 will release the holding circuit for relay 45 causing both sets of contacts 87 and 88 to be opened and the solenoid 27 to be deenergized closing the closure 22. As a matter of fact, when a voltage is produced by the discriminator which is sufficiently positive to cause both amplifiers 33 and 34 to actuate relays 39 and 40 in sequence, the operation of the relays 45 and 46 is so rapid that the solenoid 27 will not have time to open the closure 22 before it is deenergized by action of the relay 46.

Accordingly, it is seen that the operation of the A. C. relays 45 through 50 and the operation of the closure 22 through 26 thereby will correspond directly with the deviation groups specified. When a slug having a permeability differing from the standard by more than +2% is checked, the voltage produced will be so negative that none of the relays will be actuated and the slug will pass over the closures into the reject bin. Slugs falling into the various deviation groups will cause actuation of the closure associated with that group and will, therefore, fall into the proper bin. Slugs having a deviation greater than −2% will cause actuation of all the D. C. relays 39 through 44 and accordingly actuation of all the A. C. relays 45 through 50 in sequence. As previously stated, the actuation of each relay will deenergize all preceding relays and accordingly actuation of relay 50 will deenergize relays 45 through 49. Actually, deenergization of relays 45 through 49 is the only function of relay 50, as this relay does not directly control any of the closures. As the solenoids 27 through 31 are controlled by contacts of relays 45 through 49 the closures will all remain in the normal closed position since relays 45 through 49 are deenergized. Therefore, a slug deviating by more than −2% from the standard slug will not cause operation of any of the closures and will fall down the chute into the reject bin.

To insure that the operation of the various parts of the checking and sorting device takes place at the proper time and in the proper sequence, a timing section for controlling the operation is provided. Referring to Fig. 1, the switch 51 for manual operation of the device includes contacts 111 and 112 which may be closed for energizing relay 15. Upon energization of relay 15, the dropping unit 14 drops a slug in the coil 16. This sets the radio frequency oscillator in oscillation and the discriminator produces a voltage which actuates the D. C. and A. C. relays as previously described. The radio frequency circuit also actuates relay 53 setting in motion the starting relay 52. The starting relay initiates operation of the first and second timers 54 and 55, the first timer after an interval of sufficient length for the A. C. relays to operate the proper closure, actuates solenoid 19 dropping the slug from coil 16 into the chute 21. The second timer, after a slightly greater time interval which is sufficient for the slug to be deposited in the proper bin, releases the alternating current relays and restores the timing section to the normal position for the next sequence.

For automatic operation of the device, the third timer is connected into the system by opening contacts 139 and 140 and energizes solenoid 15 corresponding to the energization by contacts 111 and 112 for manual operation. The operation of the system from this point is the same as for manual operation except that the second timer will condition the third timer for initiation of another sequence and continuous operation results.

Reference is now made to Fig. 8, in connection with which the detail operation of the timing section will be described. In Fig. 8 the connections from the timing circuits to the various relays and solenoids of Fig. 1 are shown at the right side of Fig. 8 and are appropriately marked. For proper operation of the timing circuit of Fig. 8 in the system of Fig. 1, the 110 volt A. C. power input terminals must be connected in the same manner in both circuits. That is, the terminals marked X in the two figures must be common and also the terminals marked Y. An isolating transformer T (Fig. 8) is provided for providing plate potential for the thyratrons.

Figure 9:
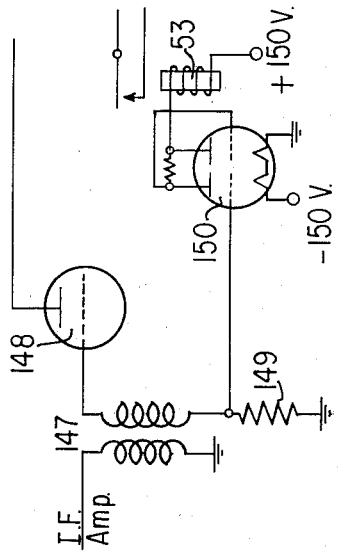
Fig. 9 is a circuit diagram of the limiter of Fig. 5 showing the connections of the relay.

For starting the operation of the system the switch 51 is provided as previously described having a non-locking position for manual operation and a locking position for automatic operation. In the non-locking position switch 51 moves contact 111 in engagement with contact 112. It is apparent from the circuits shown in Figs. 1 and 8 that closing these contacts causes the solenoid 15 to be energized and the feeding unit 14 to drop a slug in the coil 16. The radio frequency circuit will be set in oscillation by presence of the slug in the coil and the relay 53 in the circuit will be actuated energizing the starting relays 113 and 114 in the timing circuit. For an explanation of the operation of the relay 53 reference is made to Fig. 9 which shows the first limiter of the RF circuit with the relay connected in the grid circuit thereof. The first limiter is connected to the intermediate frequency amplifier by transformer 147, the secondary of which is connected to the grid of the tube 148 and through a biasing resistor 149 to ground. The tuning of the RF circuit caused by the presence of a slug in the coil 16 will cause a voltage to be fed to the transformer 147 by the intermediate frequency amplifier resulting in a voltage across the resistor 149. A direct current amplifier 150 is connected across the bias resistor and includes the relay 53 in the output circuit thereof. The amplifier may comprise a single tube including two triode sections with the sections coupled in series as illustrated. The voltage produced by the circuit as a result of a slug being placed in the coil 15 causes actuation of the contacts of relays 53 energizing the starting relays 113 and 114 of the timing circuit. The amplifier 150 may be eliminated and the relay connected directly in the grid circuit of the tube 148 but better results are obtained by use of the amplifier 150.

The energization of relay 114 will cause the contact 119 to be moved into engagement with contact 120 which is connected to the power supply, thus establishing a holding circuit through the relays 113 and 114. The energization of relay 113 will cause contact 115 to move away from contact 116 and contact 117 to move away from contact 118 as is apparent in Fig. 8. The opening of contacts 115 and 116 will remove the short on condenser 121 in the grid circuit of thyratron 122. Opening contacts 117 and 118 will similarly remove the short from condenser 123 in the grid of thyratron 124. The variable grid resistors 125 and 126 in the circuits of the thyratrons are adjusted so that thyratron 122 will fire very soon after the short on the grid is removed and so that thyratron 124 will fire at a greater time interval after the short on the grid thereof is removed. A relay 127 is connected in the output circuit of thyratron 122 and controlled thereby to close contacts 128 and 129 and contacts 130 and 131. The closing of contacts 128 and 129 causes the solenoid 19 connected to the movable bar 18 to be energized allowing the slug which is in coil 16 to be released into the chute 21. Contacts 131 and 130 are arranged to provide a shunt across condenser 132 of thyratron 133 for a purpose to be explained later. As previously stated the thyratron 124 will fire at a predetermined interval after the thyratron 122 has fired. The thyratron 124 is utilized to release the alternating current relay holding circuits and it is desired that these circuits not be released until the slug has fallen into the proper bin and accordingly sufficient time must be allowed for this. In the output circuit of thyratron 124 a relay 134 is provided having contacts 135 and 136 which are opened to deenergize the A. C. relays as previously described and contacts 137 and 138 which are also opened by the relay to disconnect the contacts 119 and 120 of the holding relay 114 from the 110 volt power supply causing the relays 113 and 114 to be deenergized. This brings the circuit back to the original condition and completes one cycle of operation of the device. To provide a second manually controlled cycle the switch 51 will have to again be actuated.

For continuous automatic operation of the device the starting switch 51 may be moved to the locking position, in which case, the contacts 139 and 140 will be broken. This removes the short from the condenser 132 of thyratron 133 causing the thyratron to fire and relay 141 to be actuated closing contacts 142 and 143 and contacts 144 and 145. Contacts 144 and 145 operate a counter (Fig. 1) to indicate the number of components checked during automatic operation of the device. The closing of contacts 142 and 143 causes energization of the solenoid 15 causing dropping unit 14 to drop a slug into the coil 16. From this point on the operation proceeds in a manner very similar to the manual operation. The contacts 131 and 130 which are closed by relay 127 when the first thyratron 122 fires shorts the grid capacitor 132 of the third thyratron 133. After the second thyratron 124 fires the holding circuit through the relays 113 and 114 is released and the grid condensers on the first and second thyratrons are again shorted releasing the relay 127 in the output circuit of the first thyratron causing contacts 130 and 131 to be opened removing the short on condenser 132 of thyratron 133. After a time interval sufficient for the A. C. relays to be released and the closures to be returned to their normal closed position, the thyratron 133 will fire initiating the operation for the second time. The time delay of thyratron 133 is controlled by adjusting the grid bias by variable resistor 146. It can be seen that as long as the contacts 139 and 140 are open, this operation will be continuously repeated providing fully automatic operation of the device.

By using the checking device according to this invention, it is possible to check one or two slugs every second as compared with about one slug every five seconds by using standard meters. The speed of the machine is variable by adjusting the time constants of the thyratrons in the timing circuits. However, it is possible to check at least five times as many slugs per hour in the machine as by manual methods and the error in the checking is much less than that obtained by using a skilled operator. Also the machine does not require the continuous attention of an operator as the hopper can be constructed to hold as many as 2,000 slugs permitting continuous operation for a period of one-half hour or so without attention by the operator. By adjusting the direct current amplifier circuits so that the direct current relays will operate when varying amounts of voltages are applied to the amplifiers, the ranges of permeability into which these slugs are sorted is variable so that slugs can be accepted or rejected within wide limits.

By providing proper feeding arrangements and means for connecting various components into a circuit which will provide varying voltages depending upon the electrical characteristics of the components, it is possible to use the device for checking many types of electrical components. For example, it is apparent that the device could be used for checking resistors by providing means for connecting the terminals of these components into a circuit including a source of potential and connecting the D. C. amplifiers directly across the resistor as the voltage across the resistor would be a measure of the resistance thereof. Simple circuits for checking condensers and coils could also be provided.

From the foregoing description it is seen that I have provided an automatic checking and sorting device including means for feeding components to a checking unit, a checking unit for producing variable voltages in accordance with electrical characteristics of the components, relays actuated in accordance with the voltages produced, distributing means for sorting the components into various groups depending upon which relays are actuated, and means for timing the various parts of the device for operation in the proper sequence and at the proper time interval.

Although I have described what is considered to be the preferred embodiment of my invention, it is apparent that various modifications and changes can be made therein without departing from the intended scope of the invention as defined in the appended claim.

I claim:

Automatic apparatus for sorting slugs to be used as cores in permeability tuned circuits in accordance with the permeabilities thereof, such apparatus including in combination, a testing coil having a vertically positioned passage therein extending through the magnetic field of the coil, a hopper adapted to contain a plurality of slugs, a channel leading downwardly from said hopper to said passage in said coil, an electromagnetically operated dropping unit in said channel for individually releasing said slugs from said hopper, said channel including a righter box with downwardly converging walls for positioning said slugs by gravity in an upright position in said passage, electromagnetically operated releasable retaining means for holding each slug in said upright position within the magnetic field of said coil, an inclined chute having an upper end thereof disposed below said passage of said coil, a plurality of sorting receptacles positioned at different points along said chute, said chute having portions movable for selectively directing slugs into said receptacles, an electric circuit coupled to said coil including an oscillator for providing oscillations of various frequencies in accordance with the permeability of the slugs which are individually positioned in said coil, said circuit also including discriminator means for producing a voltage varying with the frequency of said oscillations, a plurality of relay means, and amplifier means for selectively controlling said relay means in accordance with the voltage produced by said discriminator, said relay means being individually connected to said portions of said chute for selectively operating the same, and timing means electrically connected to said dropping unit, said retaining means and said relays for controlling the same so that said apparatus automatically operates to test said slugs in said hopper one after the other, and for depositing the same in the appropriate receptacle according to their respective permeabilities.

WILLIAM J. HUNT.

REFERENCES CITED

The following references are of record in the file of this patent:

UNITED STATES PATENTS

| Number | Name | Date |
|---|---|---|
| 1,758,268 | Wagner | May 13, 1930 |
| 2,016,455 | Purdy | Oct. 8, 1935 |
| 2,020,964 | Reiter | Nov. 12, 1935 |
| 2,312,357 | Odquist | Mar. 2, 1943 |
| 2,329,090 | Smith | Sept. 7, 1943 |
| 2,357,512 | Gaiser | Sept. 5, 1944 |
| 2,387,496 | Cornelius | Oct. 23, 1945 |
| 2,417,488 | Randforth | Mar. 18, 1947 |